United States Patent
Stewart

(10) Patent No.: US 8,448,078 B2
(45) Date of Patent: May 21, 2013

(54) METHOD AND APPARATUS FOR SELECTION OF DEFAULT MEDIA BASED ON MEDIA SIZE IN AN IMAGE PRODUCTION DEVICE

(75) Inventor: David Shawn Stewart, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 364 days.

(21) Appl. No.: 12/732,334

(22) Filed: Mar. 26, 2010

(65) Prior Publication Data

US 2011/0239159 A1 Sep. 29, 2011

(51) Int. Cl.
*G06F 3/00* (2006.01)

(52) U.S. Cl.
USPC .................... 715/764; 715/734; 715/839

(58) Field of Classification Search
USPC .......................... 715/764, 734, 839
See application file for complete search history.

(56) References Cited

U.S. PATENT DOCUMENTS

| | | | |
|---|---|---|---|
| 7,065,716 B1* | 6/2006 | Rzepkowski et al. | 715/839 |
| 7,855,799 B2* | 12/2010 | Shah | 358/1.15 |
| 2003/0011801 A1* | 1/2003 | Simpson et al. | 358/1.13 |
| 2004/0172589 A1* | 9/2004 | Small | 715/502 |
| 2005/0055641 A1* | 3/2005 | Machida | 715/734 |

* cited by examiner

*Primary Examiner* — Michael Roswell
(74) *Attorney, Agent, or Firm* — Ronald E. Prass, Jr.; Prass LLP

(57) ABSTRACT

A method and apparatus for selection of default media based on media size in an image production device is disclosed. The method may include receiving a request to display a printer user interface, displaying the printer user interface, the printer user interface having selections to enable a user to select a default media type for each default media size, receiving one or more default media selections from the user using the printer user interface, receiving a request to print a print job, and printing the print job with media designated by at least one of the one or more default media selections.

15 Claims, 5 Drawing Sheets

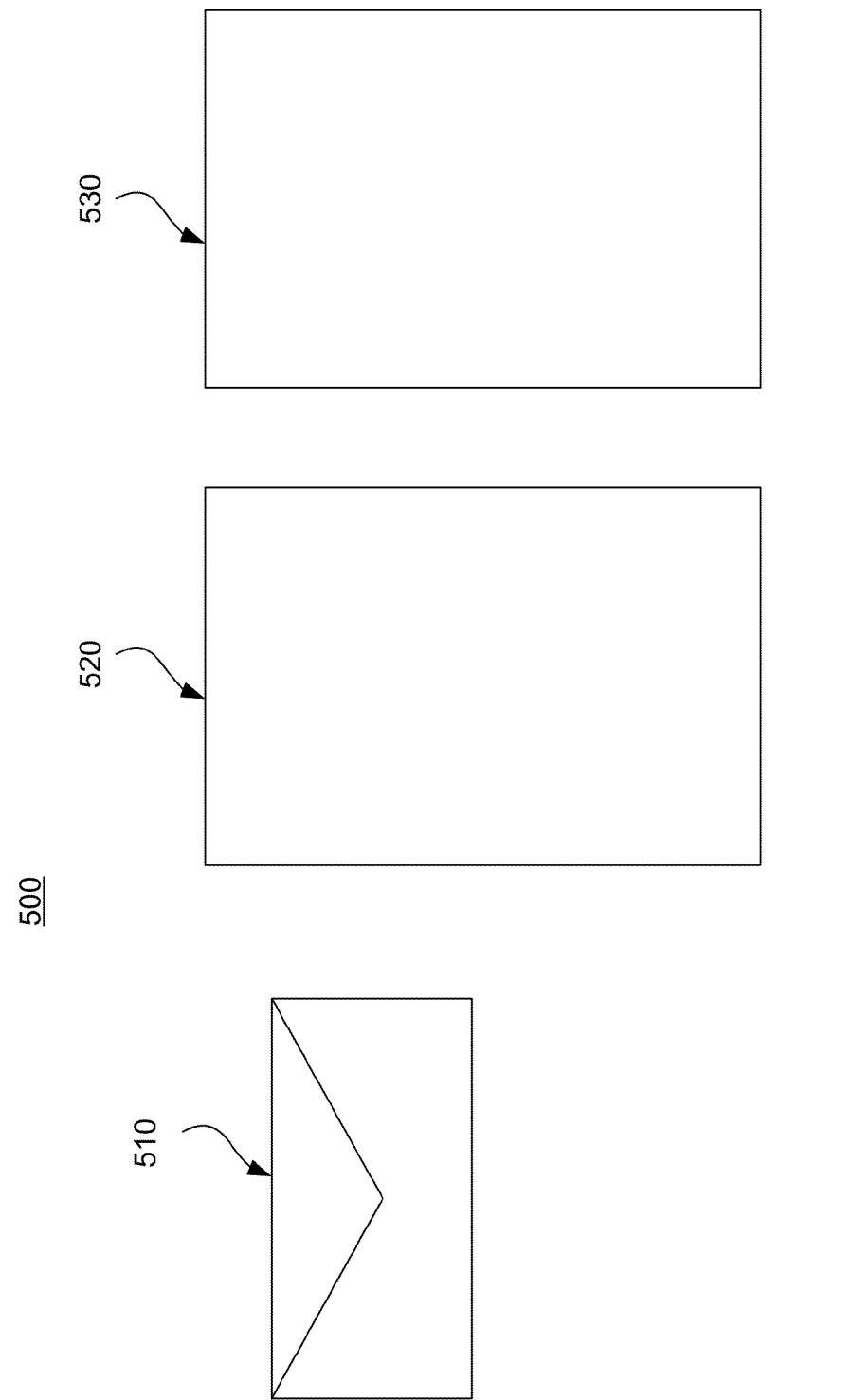

METHOD AND APPARATUS FOR SELECTION OF DEFAULT MEDIA BASED ON MEDIA SIZE IN AN IMAGE PRODUCTION DEVICE

BACKGROUND

Disclosed herein is a method for selection of default media based on media size in an image production device, as well as corresponding apparatus and computer-readable medium.

Conventional image production devices offer a variety of mechanisms for managing media selection based on size, type, color and other media definitions. These mechanisms often include the concepts of "Default Media," which maps to a default value set up for the purpose, and "Unspecified Media" which disregards that element in selection. Many users expect image production devices to "just get it right" without complex set up.

However, some common print jobs involve mixed media. A typical example of a mixed-media print job is a "mail shot" where envelopes are printed in conjunction with a cover letter, often from a mail-merge application. Many word processing applications do not allow sufficient information to be defined for each page to handle such cases.

Selecting a mixed-media job using the Default Media setting results in incorrect media being selected for one of the job elements. Alternatively, selecting Unspecified Media may work in some cases, but may make other inappropriate selections as well, depending on the manner in which the device is set up.

SUMMARY

A method and apparatus for selection of default media based on media size in an image production device is disclosed. The method may include receiving a request to display a printer user interface, displaying the printer user interface, the printer user interface having selections to enable a user to select a default media type for each default media size, receiving one or more default media selections from the user using the printer user interface, receiving a request to print a print job, and printing the print job with media designated by at least one of the one or more default media selections.

BRIEF DESCRIPTION OF THE DRAWINGS

FIG. 5 is an exemplary diagram of mixed media to be used in a possible print job in accordance with one possible embodiment of the disclosure.

DETAILED DESCRIPTION

Aspects of the embodiments disclosed herein relate to a method for selection of default media based on media size in an image production device, as well as corresponding apparatus and computer-readable medium.

The disclosed embodiments may include a method for selection of default media based on media size in an image production device. The method may include receiving a request to display a printer user interface, displaying the printer user interface, the printer user interface having selections to enable a user to select a default media type for each default media size, receiving one or more default media selections from the user using the printer user interface, receiving a request to print a print job, and printing the print job with media designated by at least one of the one or more default media selections.

The disclosed embodiments may further include an image production device that may include a printer user interface, and a default media selection unit that receives a request to display the printer user interface, displays the printer user interface, receives one or more default media selections from a user using the printer user interface, receives a request to print a print job, and prints the print job with media designated by at least one of the one or more default media selections, wherein the printer user interface has selections to enable the user to select a default media type for each default media size.

The disclosed embodiments may further include a computer-readable medium storing instructions for controlling a computing device for selection of default media based on media size in an image production device. The instructions may include receiving a request to display a printer user interface, displaying the printer user interface, the printer user interface having selections to enable a user to select a default media type for each default media size, receiving one or more default media selections from the user using the printer user interface, receiving a request to print a print job, and printing the print job with media designated by at least one of the one or more default media selections.

The disclosed embodiments may concern providing a user configurable list of defaults based on media (e.g., paper, cardstock, envelopes, etc.) sizes then allowing them to select media defaults using "System Default" so that the appropriate media may be selected automatically without additional user interaction or the possibility of inappropriate selections. For example, the media type defined for dimension lengthwise (DL) may be "Envelope," thus Envelope may be requested. The other pages may not be explicitly listed so "plain" or letter/A4 media for example, may be requested. Thus, there may be no possibility of any other media types being confused, and the print job may request media as expected and complete as expected.

Figure 1:
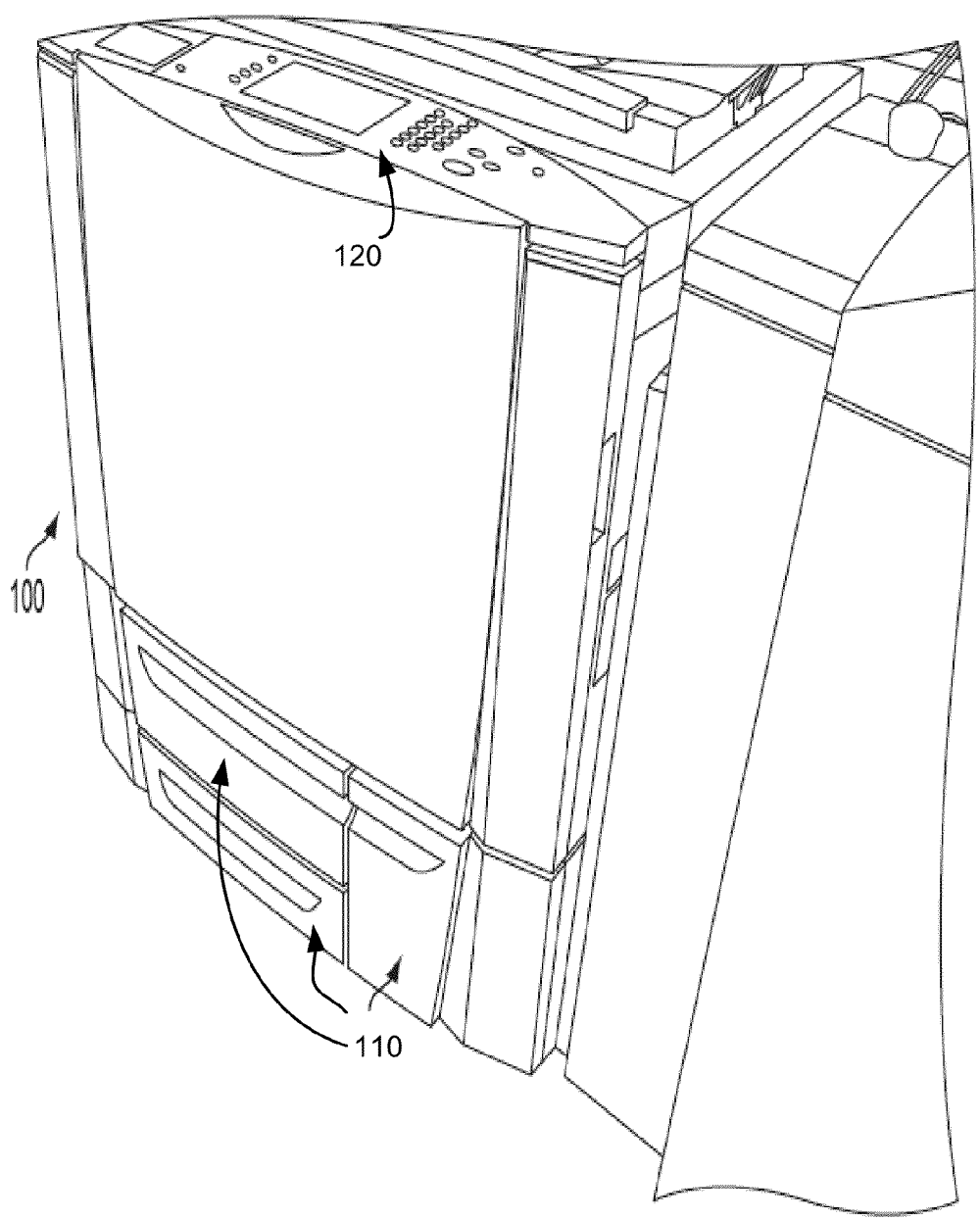
FIG. 1 is an exemplary diagram of an image production device in accordance with one possible embodiment of the disclosure.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media tray doors 110 and a local user interface 120. The one or more media tray doors 110 may provide access to one or more media trays that contain media. The one or more media tray doors 110 may be opened by a user so that media may be checked, replaced, or to investigate a media misfeed or jam, for example.

The user interface 120 may contain one or more display screen (which may be a touchscreen or simply a display, for example), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network, for example.

Figure 2:
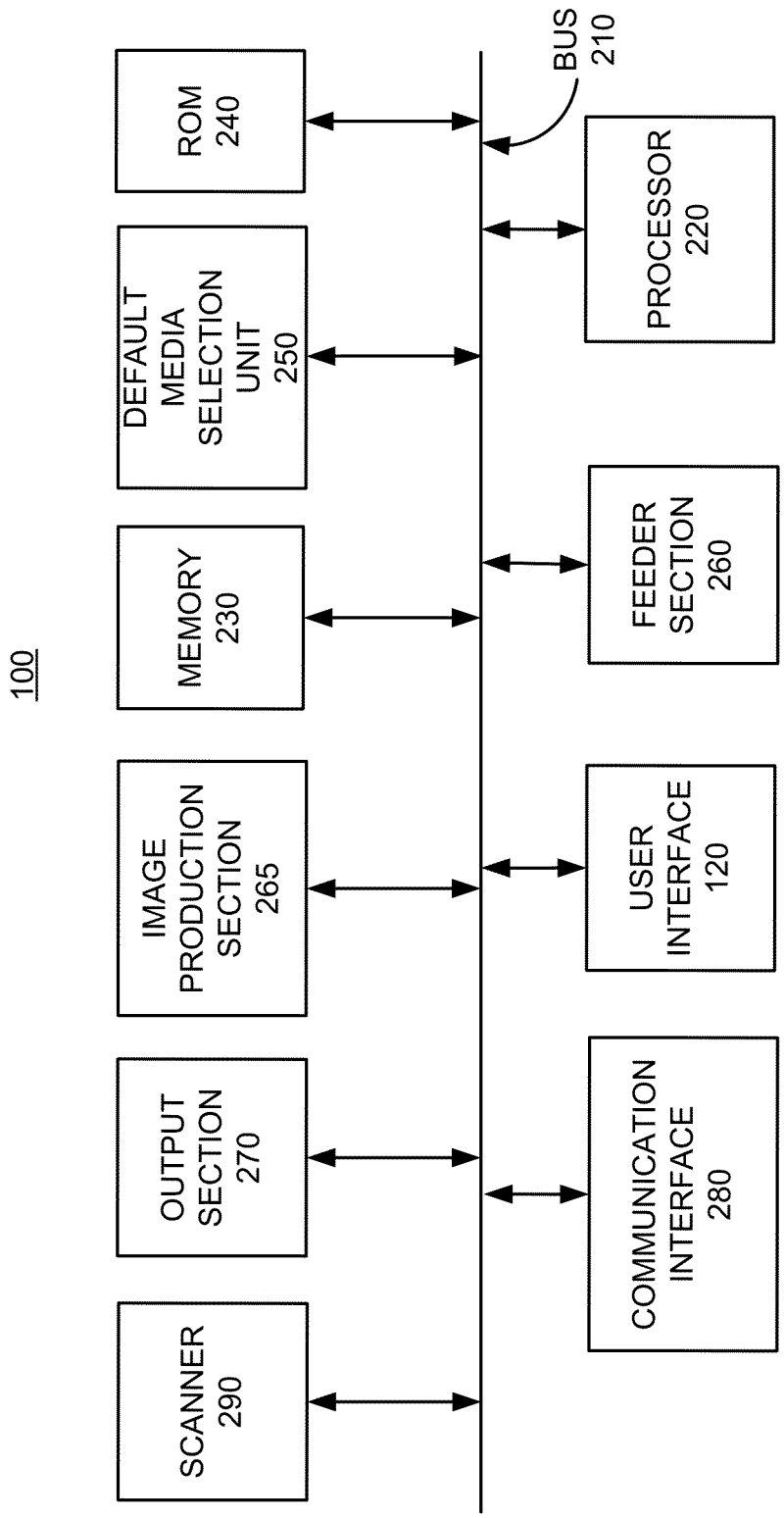
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a default media selection unit 250, the user interface 120, a feeder section 260, an image production section 265, an output section 270, a communication interface 280, and a scanner 290. Bus 210 may permit communication among the components of the image production device 100.

The image production section 265 may include hardware by which image signals are used to create a desired image. The stand-alone feeder section 260 may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner 290 which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed. The media trays may be accessed by a user by opening the one or more media tray doors 110. One or more media tray door sensors may sense if one or more media tray door is either open or closed. The one or more media tray door sensors may be any sensors known to one of skill in the art, such as contact, infra-red, magnetic, or light-emitting diode (LED) sensors, for example. The one or more media tray size sensors may be any sensors that may detect media size in a media known to one of skill in the art, including switches, etc.

Certain types of media may require special handling in order to be dispensed properly. For example, heavier or larger media may desirably be drawn from a media stack by use of an air knife, fluffer, vacuum grip or other application (not shown in the Figure) of air pressure toward the top sheet or sheets in a media stack. Certain types of coated media may be advantageously drawn from a media stack by the use of an application of heat, such as by a stream of hot air (not shown in the Figure). Sheets of media drawn from a media stack on a selected media tray may then be moved to the image production section 265 to receive one or more images thereon. Then, the printed sheet is then moved to output section 270, where it may be collated, stapled, folded, punched, etc., with other media sheets in manners familiar in the art.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 120 may include one or more conventional mechanisms that permit a user to input information to and interact with the image production device 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example. The image production section 265 may include an image printing and/or copying section, a scanner, a fuser, etc., for example. Scanner 290 may an automatic document feeder scanner, platen scanner, or any other scanner known to one of skill in the art that may be able to record and process image data.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like that are capable of displaying the print release marking and can be scanned by the image production device 100.

The operation of components of the default media selection unit 250 and the default media selection process will be discussed in relation to the flowchart in FIG. 3.

Figure 3:
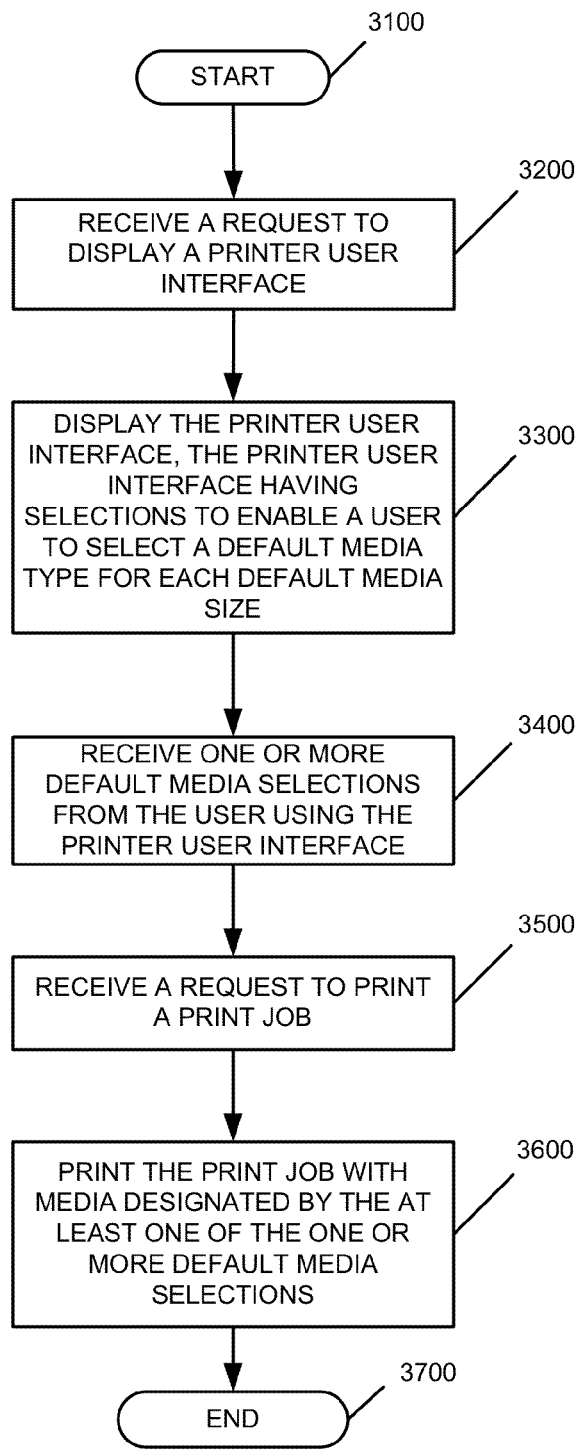
FIG. 3 is a flowchart of an exemplary default media selection process in accordance with one possible embodiment of the disclosure.

FIG. 3 is a flowchart of a default media selection process in accordance with one possible embodiment of the disclosure. The method may begin at step 3100, and may continue to step 3200 where the default media selection unit 250 may receive a request to display a printer user interface from a user. At step 3300, the default media selection unit 250 may display the printer user interface to the user. The printer user interface may have selections to enable the user to select a default media type for each default media size. For example, the printer user interface may include windows, pull-down menus, buttons, etc. to allow the user to select the default media type.

At step 3400, the default media selection unit 250 may receive one or more default media selections from the user using the printer user interface. The one or more default media selections may vary for each user and/or each image production device 100, for example. In this manner, the default media selections may follow the user to any image production device 100 in a network as part of a user profile or user preference file or be associated with an image production device 100 for all users. The one or more default media selections may be stored in the memory 230 for retrieval by the default media selection unit 250, for example.

At step 3500, the default media selection unit 250 may receive a request to print a print job. The print job may be a mixed media print job where the mixed media may include at least two of letter-sized media, A4-sized media, envelope-sized media, or postcard-sized media, for example. At step 3600, the default media selection unit 250 may print the print job with media designated by at least one of the one or more default media selections. The process may then go to step 3700 and end.

Figure 4:
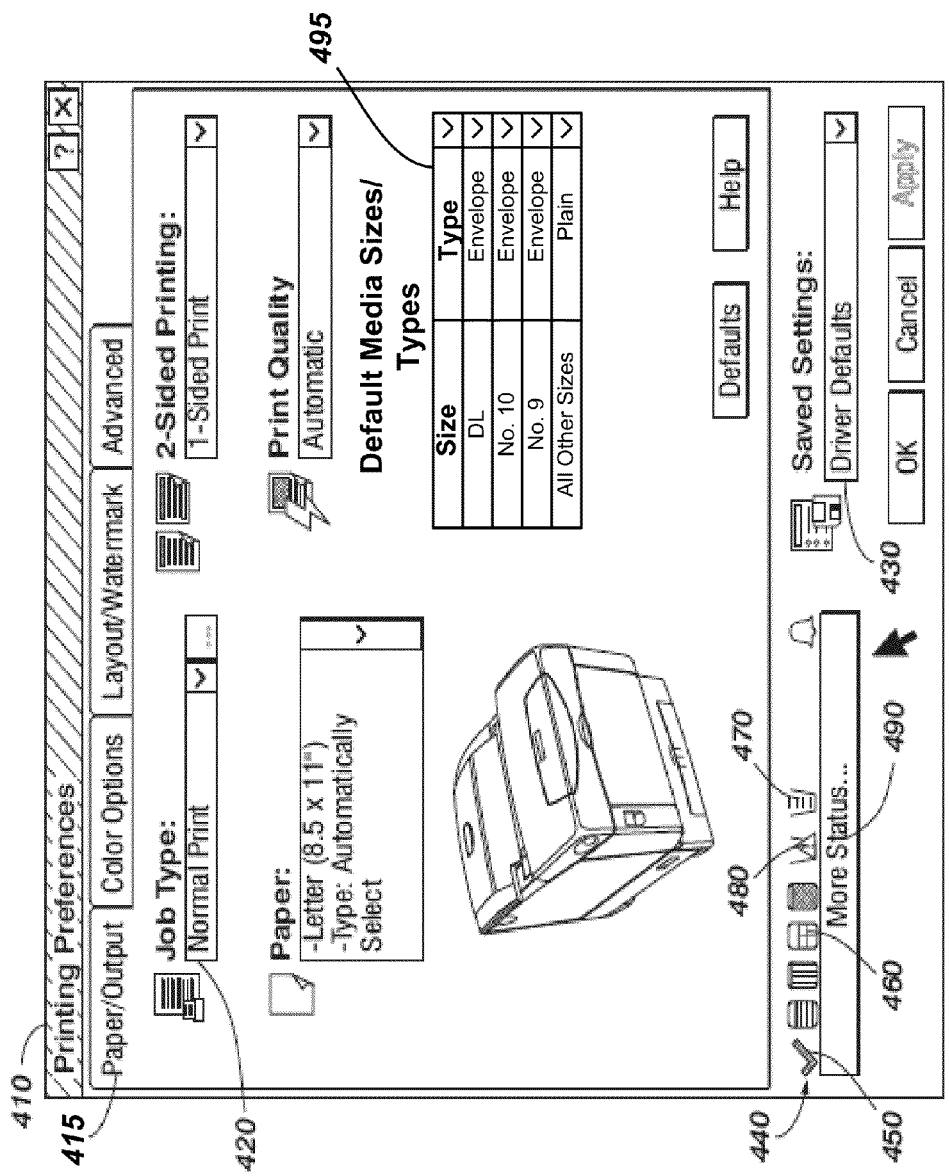
FIG. 4 is an exemplary diagram illustrating a possible user interface for selection of default media based on media size in accordance with one possible embodiment of the disclosure.

FIG. 4 is an exemplary diagram illustrating a possible user interface 410 for selection of default media based on media size in accordance with one possible embodiment of the disclosure. The printer user interface 410 may include one or more tabs where various options, configurations and preferences may be selected. In this example, the Paper/Output preferences tab 415 is shown and may include job type 420, printer default settings 430, status bar 440 (which may include icons for printer status 450, toner status 460, paper status indicators 470, and warning indicator 480), and a more status button 490. A description of the operation of these features may be found in U.S. patent application Ser. No. 11/778,883, which is incorporated herein by reference it is entirety. A user may interact with the printer user interface 410 using any input device, including a mouse, a keyboard, voice, etc., for example.

The printer user interface 410 may also include default media sizes/types preferences 495. The default media sizes/types preferences 495 may include windows, pull down menus, buttons, etc. that may allow a user to select a preferred default media type for each media size which may appear in browser window, for example. In this example, for DL, No. 10, and No. 9, the user has selected "Envelope" and for all other sizes, the user selected "plain". Other manners of presentation, prompts and selection may be used in accordance with the spirit and scope of the invention FIG. 5 is an exemplary diagram of mixed media 500 to be used in a possible print job in accordance with one possible embodiment of the disclosure. In this mixed media example 500, the user wishes to print an envelope 510 and two letter-sized sheets 520, 530 in the same print job. The default media selection unit 250 may retrieve the default media selections from memory 230 and print the print job according to the retrieved default media selections. In this manner, the envelope 510 is printed first and the two letter-sized sheets 520, 530 are printed next in a seamless and errorless fashion.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for selection of default media based on media size in an image production device, comprising:
    receiving a request to display a printer user interface;
    displaying the printer user interface, the printer user interface having selections to enable a user to select a default media type for each of a plurality of default media sizes;
    receiving default media type selections from the user using the printer user interface for at least two of the plurality of default media sizes;
    receiving a request to print a mixed media print job, the mixed media print job specifying at least two media sizes; and
    printing the mixed media print job with media designated by the default media type selections for each of the at least two media sizes specified in the mixed media print job,
    the default media type selections being separately selectable for each user and each image production device.

2. The method of claim 1, the at least two media sizes in the mixed media print job including at least two of letter-sized media, A4-sized media, envelope-sized media, and postcard-sized media.

3. The method of claim 1, the printer user interface including a window to allow the user to select the default media type.

4. The method of claim 1, further comprising storing the default media type selections in a memory.

5. The method of claim 1, wherein the image production device is one of a copier, a printer, a facsimile device, and a multi-function device.

6. An image production device, comprising:
a printer user interface having selections to enable a user to select a default media type for each of a plurality of default media sizes; and
a default media selection unit that is configured to:
   receive a request to display the printer user interface,
   display the printer user interface,
   receive default media type selections from the user using the printer user interface for at least two of the plurality of default media sizes,
   receive a request to print a mixed media print job, the mixed media print job specifying at least two media sizes, and
   print the mixed media print job with media designated the default media type selections for each of the at least two media sizes specified in the mixed media print job,
   the default media type selections being separately selectable for each user and each image production device.

7. The image production device of claim 6, the at least two media sizes in the mixed media print job including at least two of letter-sized media, A4-sized media, envelope-sized media, and postcard-sized media.

8. The image production device of claim 6, the printer user interface including a window to allow the user to select the default media type.

9. The image production device of claim 6, further comprising a memory,
   the default media type selections being stored in the memory.

10. The image production device of claim 6, wherein the image production device is one of a copier, a printer, a facsimile device, and a multi-function device.

11. A non-transitory computer-readable medium storing instructions, which when executed by a computing device, cause the computing device to execute a method for selection of default media based on media size in an image production device, the method comprising:
   receiving a request to display a printer user interface;
   displaying the printer user interface, the printer user interface having selections to enable a user to select a default media type for each of a plurality of default media sizes;
   receiving default media type selections from the user using the printer user interface for at least two of the plurality of default media sizes;
   receiving a request to print a mixed media print job, the mixed media print job specifying at least two media sizes; and
   printing the mixed media print job with media designated the default media type selections for the at least two media sizes specified in the mixed media print job,
   the default media type selections being separately selected for each user and each image production device.

12. The non-transitory computer-readable medium of claim 11, the at least two media sizes in the mixed media print job including at least two of letter-sized media, A4-sized media, envelope-sized media, and postcard-sized media.

13. The non-transitory computer-readable medium of claim 11, the printer user interface including a window to allow the user to select the default media type.

14. The non-transitory computer-readable medium of claim 11, further
   comprising storing the default media type selections in a memory.

15. The non-transitory computer-readable medium of claim 11, wherein the image production device is one of a copier, a printer, a facsimile device, and a multi-function device.

* * * * *